(12) United States Patent  
Jones et al.

(10) Patent No.: US 8,654,869 B2
(45) Date of Patent: Feb. 18, 2014

(54) MULTI-PATH RADIO TRANSMISSION INPUT/OUTPUT DEVICES, NETWORK, SYSTEMS AND METHODS WITH LINK SUITABILITY DETERMINATION

(75) Inventors: Benjamin Peter John Jones, Stafford (AU); Harry John Courtice, Stafford (AU)

(73) Assignee: Cooper Technologies Company, Houston, TX (US)

( * ) Notice: Subject to any disclaimer, the term of this patent is extended or adjusted under 35 U.S.C. 154(b) by 202 days.

(21) Appl. No.: 13/282,828

(22) Filed: Oct. 27, 2011

(65) Prior Publication Data

US 2013/0107909 A1 May 2, 2013

(51) Int. Cl.
*H04L 27/00* (2006.01)
(52) U.S. Cl.
USPC ........... 375/259; 375/285; 370/230; 370/231; 370/235; 370/241
(58) Field of Classification Search
USPC ......... 375/132, 224, 227, 228, 259–260, 267, 375/219, 285, 295–296, 346, 349; 370/229, 370/230, 231, 235, 241, 252, 208
See application file for complete search history.

(56) References Cited

U.S. PATENT DOCUMENTS

| | | | |
|---|---|---|---|
| 7,133,686 B2* | 11/2006 | Hundal et al. | 455/465 |
| 2006/0067282 A1* | 3/2006 | Sherman et al. | 370/338 |
| 2009/0274347 A1* | 11/2009 | Gat et al. | 382/128 |
| 2010/0304738 A1* | 12/2010 | Lim | 455/426.1 |
| 2010/0329225 A1* | 12/2010 | Balasubramanian | 370/338 |
| 2011/0051709 A1* | 3/2011 | Roberts | 370/339 |

* cited by examiner

*Primary Examiner* — Jean B Corrielus
(74) *Attorney, Agent, or Firm* — Armstrong Teasdale LLP

(57) ABSTRACT

Devices, networks, systems and methods for coordinating communications on multi-path radio transmission mesh networks include evaluating available path metrics to ensure the best available connection routes through the network can be understood and utilized. The evaluation of the path metric may include comparing an $x^{th}$ percentile signal strength indication (RSSI) value with a predetermined RSSI threshold level, wherein x is strategically selected to address multi-path signal fading issues.

26 Claims, 8 Drawing Sheets

MULTI-PATH RADIO TRANSMISSION INPUT/OUTPUT DEVICES, NETWORK, SYSTEMS AND METHODS WITH LINK SUITABILITY DETERMINATION

BACKGROUND OF THE INVENTION

The field of the invention relates generally to input/output devices for wirelessly communicating data in industrial monitoring and control systems, and more specifically to radio frequency (RF) mesh network communication systems.

Supervisory Control and Data Acquisition (SCADA) systems are in widespread use for monitoring and controlling industrial processes of all types. Such SCADA systems typically include a number of remotely monitored locations including sensors, and data and information associated with the sensors at each of the remotely monitored location are communicated via a communications network to other locations, and ultimately to a centralized computer system that manages data collected and controls operation of the industrial process, equipment or facilities associated with the industrial processes. Control commands can likewise be sent to the remote locations using the communications network. In certain applications, the use of long and/or short range radio devices in the data communication networks is highly desirable, and thus RF communication devices have generally been adopted in certain industries for SCADA systems.

In state-of-the-art industrial data communication systems for monitoring and control purposes, spread-spectrum, frequency-hopping RF technology is implemented in mesh network topologies. In such systems, a number of radio devices are arranged to establish a communications network wherein each radio device may communicate with multiple other devices in the network. The spread spectrum technique spreads the RF energy over a predetermined communication channel or channels to reduce the effect of interference as the network operates, while frequency hopping allows the radio devices to use multiple frequencies. Such frequency diversity increases the robustness of each signal path between radio devices in the network, and may effectively overcome interference, destructive reflections or null spots that would otherwise disrupt communications. Mesh networking of the radio devices also provides redundant signal paths such that, even if certain signal paths become unavailable or inoperable to communicate data, communications may still be transmitted using alternate signal paths.

While frequency hopping radio frequency (RF) mesh networks are advantageous in many aspects, they are not without problems, and improvements are desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
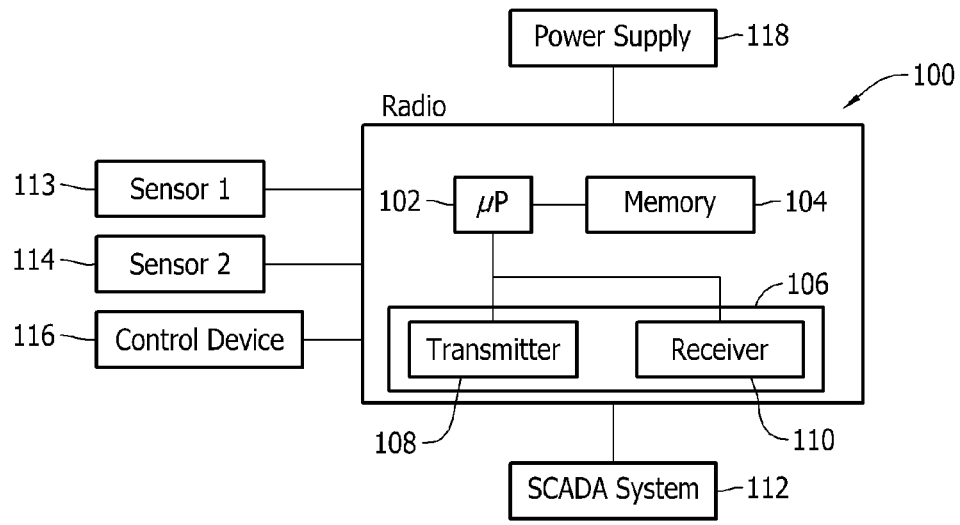
FIG. 1 is a schematic diagram of an exemplary industrial input/output device for wirelessly communicating data in an industrial SCADA system.

FIG. 1 is a schematic diagram of an exemplary industrial input/output device 100 configured to receive input data regarding an industrial process and to communicate the data to a remote location using wireless transmission techniques. More specifically, and as explained below, the input/output device is a radio device 100 that, in combination with other similar devices, may be used to establish a multi-path, wireless data communications network for industrial monitoring and control purposes as further described below.

In the example shown, the radio device 100 is a programmable processor-based device including a processor 102 and a memory storage 104 wherein executable instructions, commands, and control algorithms, as well as other data and information such as communication network and protocol parameters required to satisfactorily operate the radio device 100 are stored. The memory 104 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

The radio device 100 also includes a radio transmission element 106 that may include a transmitter 108 and a receiver 110. The transmitter 108 and receiver 110 may be separately provided from one another, or alternatively may be combined into a single device referred to as a transceiver. The radio transmission element 106 sends and receives wireless data signals using known radio frequency transmission techniques. The data and information communicated with the radio transmission element 106 may be processed, formatted or converted into an appropriate communications protocol by the processor 102 utilizing information stored in the memory 104. For example, digital radio frequency signals may be transmitted and received using a specified protocol for the contents of the data messages sent in a particular communications network. Parameters for network communication may include data and information such as the size (i.e., the number of bits) of the data signals transmitted, the order of bits constituting the message, unique radio identifiers, hardware and software version codes, security codes, diagnostic codes and the like as those in the art will appreciate.

Additionally, desirable signal processing such as amplification, filtering, signal conversion (e.g., digital to analog conversion), and diagnostic procedures may be performed. Algorithms and instructions for executing specific communication protocols and procedures are stored in the memory 104, for example, and executed by the processor 102 to communicate information over a communication network, which may be part of a SCADA system 112. The radio device 100 may be part of a remote terminal unit (RTU) in a SCADA system 112.

The radio device 100, as shown in FIG. 1, may be connected to inputs such as sensors, transducers and like monitoring or condition detecting elements associated with the industrial process being monitored and controlled (collectively referred to herein as "sensors") indicated by the reference numerals 113 and 114 and an output element 116 such as a control device for an industrial process. The sensors 113 and 114 generate and provide control feedback signals indicative of the state of the industrial process, and the control device 116 provides for adjustment of the monitored process at the point of the sensors 113 and 114 to effect changes in the state. A variety of sensors are known to detect various aspects of the monitored state which may correspond to a machine state, a component state, a process step, or other parameter of interest to the SCADA system 112. As examples only, monitored aspects of an industrial process detected by the sensors 113 and 114 may include electrical states or conditions (e.g., current or voltage conditions), mechanical states or conditions (e.g., position, velocity, acceleration, stress and strain), a physical state or condition (e.g., temperature, phase, or formulation), an environmental state or condition (e.g., noise, vibration, air quality) and other states or conditions of interest.

A variety of control devices 116 are also known and familiar to those in the art, any of which may be utilized to maintain desired states or conditions of the industrial process, effect changes in states or conditions of aspects of the industrial process, and respond to abnormal or unacceptable states or conditions at various points of interest in the industrial process, related equipment and/or related facilities. The control device 116 may include or may coordinate, switching elements, machine controls or component controls to affect a change in state or condition without human intervention, may interrupt the industrial process to avoid undesirable results stemming from detected states or conditions, or may activate alarm elements and features for response and decisions to be made by human persons. It is understood that the control element 116 may be in the same or different physical location as the sensors 113, 114. That is, the control element 116 may be located upstream or downstream from the sensors 113, 114 in the industrial process such that in practice the sensors 113, 114 and the control element 116 may not be connected to the same radio device 100.

Furthermore, while two sensors 113, 114 and one control device 116 are shown, it is understood that other numbers of sensors and control devices may alternatively be connected to the radio device 100 or to radio devices 100 with like effect. In different embodiments, the sensors 113 and 114 may be hard wired to the radio device 100, may wirelessly communicate with the radio device 100, or be combinations of hardwired and wireless devices. Typically, a number of radios 100 are distributed throughout the industrial process, with each radio 100 connected to different sensors to provide control inputs and feedback throughout the industrial process, and the radios communicating in a network using the specified communication protocol.

In addition, instead of dedicated sensors and control devices as shown, the functions of these devices could be combined in one or more input/output devices that are capable of bi-directional communication with the radio device or devices 100. In any event, data and information collected via the sensors and/or control devices is collected by each radio device 100 in the SCADA system 112, and communicated to a remote location using the specified communications protocol. Additionally, information such as control commands may be received by the radio device 100 from a remote location according to the specified communication protocol, and sent to the control device 116.

In the example shown in FIG. 1, the radio device 100 is implemented as a sensor node in the larger SCADA system 112. That is, the radio device 100 inputs or receives output signals from the sensors 113 and 114 and outputs or transmits data signals for communicating the sensor signals to a remote location using the proper communications protocol. In another implementation, however, the radio device 100 may function as a control node. When implemented as a control node, the radio device 100 does not directly communicate with any sensor, but rather receives data signals from other radio devices in the network and re-transmits those communications according to the proper communications protocol. In an exemplary embodiment, the radio device 100 is capable of operating in both sensor and control nodes and may be interchangeably used as either one, although if desired dedicated sensor radios and dedicated control radios could alternatively be utilized.

The radio device 100 may be configured as a long range radio device capable of transmitting and receiving radio frequency signals wirelessly over distances of 10-20 km, for example. Compared to other radio devices, the radio device 100 may be considered a relatively high power device designed to broadcast signals over extended distances. An external power supply 118 is therefore connected to the radio device 100, as batteries and other energy storage devices would not provide sufficient power levels to continuously operate the radios over extended time periods as SCADA systems sometimes require.

In different embodiments, the external power supply 118 may be an alternating current (AC) or direct current (DC) power supply coupled to the radio device 100 with an external power line or cable, for example. Generally permanent, hard wired power connections may be established using known screw terminal connections or other suitable techniques for such relatively high powered devices. Additionally, transformers, power amplifiers and the like may be provided in the device 100 to step or step down power supplied from the external supply 118 as necessary, as well as AC to DC or DC to AC converters that may be desirable.

Of course, the radio device 100 may alternatively be configured as a short range radio for communication over shorter distances. When configured as a short range radio, the device 100 may be adequately powered, if desired, by battery devices or other on-board power supplies as those in the art would appreciate. Likewise, short range radio devices may be powered by an external power supply 118 as desired. Any given network of radio devices may include combinations of long and short range radio devices.

Figure 2:
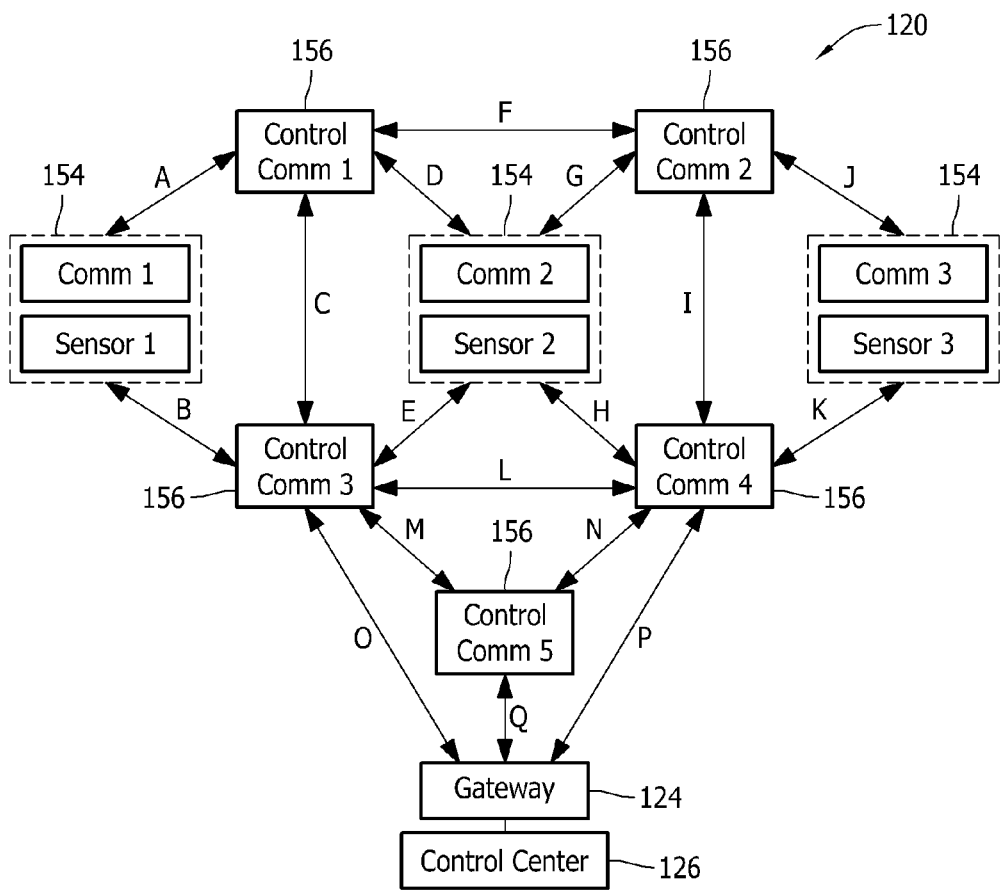
FIG. 2 schematically illustrates an exemplary mesh communication network defined by a plurality of input/output devices such as that shown in FIG. 1.

FIG. 2 schematically illustrates an exemplary installation layout of a communications network 120 established with radio devices such as the devices 100 described above. In FIG. 2, the radio devices are generally indicated as part of sensor communication nodes 154 or control communication nodes 156. As shown in FIG. 2, the sensor nodes 154 are associated with one or more sensors at specific points of interest in the industrial process, while the control nodes 156 are associated with sensor nodes 154. Generally speaking, the sensor nodes 154 transmit data signals including state information as detected by the sensors, and the control nodes 156 establish communication paths to and from the sensor nodes 154 and remote command and control centers for the SCADA system.

That is, as shown in FIG. 2, the sensor nodes 154 monitor one or more local operating characteristics of the industrial process proximate their connection locations. In various embodiments, the sensor communication nodes 154 may be mounted on poles, for example, or may alternatively be provided above ground on another support structure, on the surface of the ground, or in the ground in various installations. The control communication nodes 156 are arranged about and interspersed with the sensor communication nodes 154, and are arranged in a mesh network providing multiple wireless communication paths, labeled A through Q in the example of FIG. 2, between the sensor communication nodes 154 and the control communication nodes 156, between the different control communication nodes 156, and from the control communication nodes 156 to a signal collector or gateway device 124.

The gateway device 124 is itself a processor-based radio device configured to communicate with the sensor nodes 154 and control communication nodes 156. In exemplary embodiments, the gateway device 124 may be a dedicated device specifically adapted for gateway functionality and hence distinct from the radio devices associated with the sensor nodes 154 and the control communication nodes 156. In another embodiment, the radio devices 100 (FIG. 1) that are used to establish the sensor nodes 154 and control communication nodes 156 may be configured to act as gateway devices as needed or as desired.

Broadcast signals from the sensor communication nodes 154 are accordingly transmitted by and amongst the control communication nodes 156 in the network 120 to the gateway device 124. Likewise, control commands may be broadcast from the gateway device 124 and transmitted to a particular sensor node by and amongst the other sensor nodes 154 and/or control communication nodes 156 in the network 120. Because of the multiple and redundant signal paths between the sensor nodes 154, the control communication nodes 156, and the gateway device 124, data signals may be reliably transmitted through the communication network 120 to the gateway device 124 even if some of the communication nodes 156 are temporarily compromised (via obstruction, interference, loss of power, etc.), or have failed (via unrecoverable malfunction, damage, defect, etc.) and cannot be used. Paths that cannot be used are sometimes referred to as being "unavailable", and it is possible for communication paths to unpredictably switch state from available to unavailable, and vice versa, as different events occur and as operating conditions change. When paths become unavailable, communications can be re-routed through other available paths. Because the radios are in frequent communication with one another, it will generally be known by any radio which of its neighbouring radios within signal range is available, or unavailable, to receive a communication.

Many different mesh topologies are known and may be employed in the network 120. In an exemplary embodiment, the radio devices and associated sensor and control communication nodes are configured to provide a 902-928 MHz, frequency hopping spread spectrum, mesh topology. The mesh network may be algorithmically based and configured to meet specific needs for specific installations. The mesh network may also be self-configuring and self healing with autorouting and rerouting capability, and is therefore readily scalable. That is the network is readily adaptable and amenable to addition and subtraction of sensor nodes 154 and communication nodes 156.

In exemplary installations, the control communication nodes 156 may be provided in locations spaced from the sensor communication nodes 154, and may be mounted on utility poles, for example, or may alternatively be provided above ground on another support structure, on the surface of the ground, or in the ground in various installations. The spacing of control communication nodes 156 and sensor communication nodes 154 is primarily dependent upon the signal range of the radio devices 100 (FIG. 1) utilized, the actual frequency selected for the communication, and the ambient environment of the nodes 154 and 156. For example, nodes 154 and 156 in above ground installations that are generally free from any obstructions or impediment may be spaced farther from one another than for ground surface or below surface installations.

Digital signal processing transmission techniques utilizing encoded data packets may be employed by the communication nodes 154 and 156 to convey signals including a variety of data and information of interest for a wide variety of devices. That is, the communications protocol may be a byte oriented protocol having multiple bits representative of information of interest. The encoded data and bits of information used to generate data packets for the signals transmitted may include unique radio identifiers corresponding to each of the sensor nodes 154 in the power system, serial numbers for equipment and devices monitored by the sensor nodes, device type codes for monitored equipment and devices, a location code for each sensor node, wireless addresses for the control communication nodes in the signal transmission system, time/date stamps, a software revision code for the application software, a hardware revision code for the gateway device, a data packet count for an incoming message, an error count for incoming data packets and messages, and error codes corresponding to different error conditions for the sensor nodes, the control communication nodes in the signal transmission system, and/or error conditions in the control center 126. Customer identifiers and contact information for operators and maintenance personnel in response to a detected alert or alarm conditions may also be encoded in the signals.

While some exemplary message codes have been described, it is understood that other types of codes, information and data may be included in alternative embodiments, and it is also recognized that less than all of the exemplary protocol bits and codes could be used in other embodiments.

Implementation of the message protocols, except as specifically discussed below may be conventionally provided.

The communication nodes 156 are sometimes referred to as repeater/router elements, and the data signals are transmitted among the control communication nodes 156 in a prescribed manner to the gateway device 124. In a further embodiment, one or more of the sensor communication nodes 154 may directly communicate with the gateway device 124, depending on the signal range of the communication nodes and the proximity of the gateway device 124.

Data packets may be reported from the sensor communication nodes 154 on a periodic basis, and data packets may be transmitted repeatedly within specified time periods to ensure that the data packets are completely received, processed, and optionally acknowledged by the gateway device 124. Repeated transmission of data signals avoids collision of signals when more than one of the circuit protectors operates at approximately the same time. Also, the communication nodes 156 may add a routing code, a time stamp or other information to the data packet so that the communication system and signal paths between the sensor communication nodes 154 and the control communication nodes 156 may be monitored.

The gateway device 124 collects the data signals of the communication nodes, and communicates the data signals in the same or different form to control center 126 of the SCADA system 112 (FIG. 1) for processing. More than one gateway device 124 and/or more than one control center 126 may be provided, and a single gateway device 124 may communicate with more than one control center 126. The gateway device 124 may be a network based computer server system, a personal computer, a computer workstation, a programmable logic controller or other electronic controller, a processor-based hand held device or another electronic device or equivalent thereof that may receive, condition, process or interpret signals from the communication nodes 156, and communicate the signals to the control centers 126.

Communication between the gateway device 124 and the control centers 126 may utilize long-range communication schemes such as optical fiber transmission, broadband over powerline systems, WiMAX systems, WiFi systems, Ethernet connections, satellite communications, and the like.

The gateway device 124 may perform data reduction algorithms for processing signal transmissions from the control communication nodes 156 before communicating with the control centers 126. For example, the gateway device 124 may filter incoming data signals and identify duplicate signal transmissions that may occur, for example, when more than one of the communication nodes 156 transmits the same signal to the gateway device 124, or as another example, when the same sensor node 154 signals the communication nodes 156 more than once. Duplicate signals may be discarded or deleted by the gateway device 124 prior to communicating signals to the control centers 126.

Data reduction algorithms performed by the gateway device 124 may also reduce or eliminate information from the data signals that are not necessary for the control center functionality. For example, messaging protocol information pertinent to the radio frequency transmission of the data signals in the network 120 but not pertinent to a messaging protocol for the gateway communication to the control centers 126 may be stripped, eliminated, or deleted from the data signals before transmission to the control centers 126.

The gateway device 124 may also perform authentication, verification, or security algorithms to ensure the integrity of the signals of the communication nodes, as well as perform diagnostic, testing, and troubleshooting procedures to ensure proper installation and operation of the communication nodes 154 and 156.

Communicated signals from the gateway device 124 may be received at the control centers 126 where they may be processed, decoded or interpreted using appropriate hardware and software. Interactive, menu driven and graphic displays may be presented to the user at the control station 126, allowing the user to capably oversee the industrial process(es) being monitored in more or less real time as operating conditions change. The user or operator of the software may be prompted to take appropriate action in response to detected events, alarms and alerts may automatically be generated to appropriate persons, and certain protective actions may be automatically undertaken by the control system in response to communication from the sensors.

Additionally, sensed data information and reports may be complied and generated by the gateway device 124 and/or the control centers 126 as a useful tool for proactive management of the monitored industrial process(es).

Having now described the basic operating algorithm features of the gateway device 124 and the control centers 126 functionally, programming of the gateway device and control center equipment to operate in the manner described may be conventionally provided by those in the programming arts without further explanation.

The network 120 may generally be used in a wide variety of industrial applications. Exemplary applications may include: pharmaceutical plants, systems, and production facilities, oil and gas production and distribution systems and facilities; mining production and refining systems and facilities; water and waste water treatment systems and facilities; utility distribution (e.g., natural gas and electric power systems and distribution networks); aquaculture and agricultural production systems and facilities; pulp and papermill manufacturing systems and facilities; and road and rail network management systems and facilities. Still other applications are possible, as the network configuration capabilities are practically unlimited for use in different end use applications.

While the invention has thus far been described in the context of a single communications network 120, multiple communications networks may be advantageous for the maintenance and oversight of certain industrial systems and facilities. Accordingly the communication networks established with the radio device 100 (FIG. 1) may be established as stand alone networks, or may share communication nodes with other mesh networks to increase the redundancy and improve reliability of the SCADA system. Various communication networks may be categorized, grouped, or sub-grouped as desired to accommodate complex industrial systems and facilities, or to control different facilities or distribution systems over widespread geographic areas.

For example, the control communication nodes 156 in various mesh networks may be discretely grouped into defined areas and utilize short range communication techniques, with longer range communication techniques being utilized to transmit information between different facilities. Further, it may be desirable to provide mesh networks that may communication with one another through the longer-range gateway device 124, as well as with the central control center 126. Special purpose mesh networks may also be created, and such special purpose mesh networks may overlap wholly or partially with other mesh networks, or may stand alone from other mesh networks.

In further embodiments, providing more than one gateway device 124 may be desirable to further enhance communications by reducing the number of communication nodes need to reach the gateway device 124, or to facilitate communication between different communication networks. When multiple gateway devices 124 are provided, some communication nodes 156 may communicate selectively with some of the gateway devices but not with others. That is, special purpose gateways may be provided that collect only certain types of messages and ignore others.

The benefits of such mesh communication networks are numerous. The sensor nodes 154 and the communication nodes 156 may be retrofit to existing facilities, equipment and devices, and expensive point-to-point wiring is avoided via the wireless communication. The relatively costly gateway device 124 may be shared by hundreds of communication nodes, lowering overall equipment costs of the system. As mentioned earlier, the additional nodes can either be allowed to communicate with the nodes within its own family group, or they can use existing nodes to assist in the meshing capability of the network, leading to further cost savings.

Expansion of the network 120 may be accomplished by simply adding communication nodes 154 and 156 in the signal range of other communication nodes 156. The node count may be rapidly expanded to accommodate growth and changes in monitored industrial processes and facilities. Regardless of expansion or modification of the power system 100, given the low relative cost of the communication nodes, additional communication nodes can be readily added into the network to monitor additional points of interest if desired.

Communication between the nodes 156 and the gateway device 124 may be bi-directional, facilitating transmission of control signals corresponding to command instructions from the control centers 126 to a specific location in the monitored industrial process.

The communications protocol is adaptable to communicate virtually any type of information or type of data to the control center, and control decisions could be made based upon the communicated information. In certain networks of the type described, and particularly in frequency hopping, radio frequency mesh networks, certain problems can occur.

For example, the communication protocol may include a so-called on ad-hoc on demand distance vector (AODV) routing algorithm which is a routing protocol designed for ad hoc networks. AODV is capable of unicast and multicast routing and is an on demand algorithm, meaning that it builds and maintains routes only as long as they are needed by the source devices (i.e., the radio devices associated with the sensor nodes and communication nodes).

In one implementation the AODV protocol may include a look-up table that may be stored in the memory 104 (FIG. 1) of the radio devices 100. The lookup table associates radios in the network and possible destinations in the network, and also associates the best known route to the destination with a network path metric. The protocol uses sequence numbers to ensure the routes are kept as current as possible. The AODV protocol is loop-free, self-starting, and can scale to a large numbers of nodes as the network is defined. By virtue of the lookup table, each radio may be provided with some intelligence regarding its relative position in the network from possible destinations. This intelligence is desirable for identifying and evaluating potential paths for communications through the network via generation of Route Request (RREQ) messages and Route Reply (RREP) messages as explained below.

In the AODV protocol, the various radio devices in the sensor and control nodes 154 and 156, when operating as source radios for data transmissions, request route information through the network to a desired destination via one or more other radio devices of the network nodes within signal range. Such request is made using a Route Request message (RREQ) message to other radio devices within signal range identifying the end destination for a communication on the network. For discussion purposes, a radio device broadcasting a RREQ message is deemed a "source" radio, and other radio devices in the network are deemed "station" radios that define a connection path route from the source radio to the desired destination. A station radio may directly or indirectly communicate with the destination. A direct communication path exists when a station radio is within signal range of the destination and can communicate with the destination without involving any other station. An indirect communication path exists when a station radio can only complete a communication path to the destination through another station radio.

Generally speaking, the radio devices associated with any of the sensor nodes 154 and the control nodes 156 shown in FIG. 2 are capable of operating as a source radio, a station radio, or a destination radio in the network. It is recognized, however, that the source or destination need not be one of the sensor nodes 154 or the control nodes 156 in all instances. The gateway element 124, for example, may be the source or destination for route requests.

Any generated Route Request (RREQ) messages from a source radio in such a system results in a number of Route Reply (RREP) messages from the station radio devices within signal range of the source radio broadcasting the request. Each station radio device that receives the RREQ message from the source radio will either respond to the source radio and advise that a route to the destination identified in the RREQ message is available for a communication, or if a route to the destination is not available from that station radio, the station radio will forward the RREQ message by re-transmitting the RREQ message to other station radios for response.

In one contemplated embodiment, for example, the metric stored in the look-up table may be a number representative of a distance associated with an available path from the station radio receiving the RREQ message to the destination. In one contemplated embodiment, the path metrics may be integer numbers, with a smaller number indicating a shorter, and hence more desirable, signal transmission path from the station radio to the destination and a higher number indicating a longer, and hence less desirable, signal transmission path from the station radio to the destination. By comparing RREP messages and the path metrics, preferred communication paths may be made known to the source radio and utilized to improve performance of the network.

Figure 3:
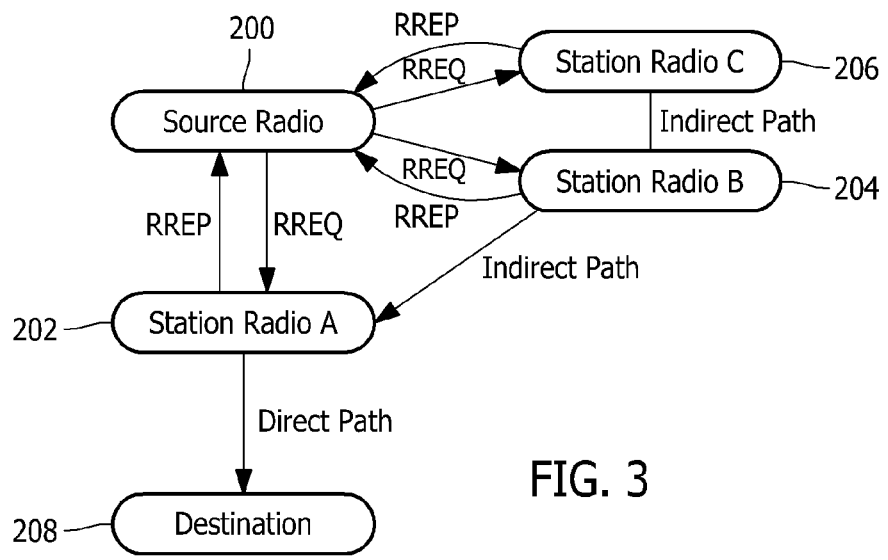
FIG. 3 illustrates an exemplary portion of a mesh network and multiple communication paths from a source radio to a destination.

As an illustrative example, and referring to FIG. 3 a source radio 200 sends a RREQ message to multiple station radios 202, 204 and 206 in signal range of the source radio 200. The station radio 202 (station A) has a direct path to the requested destination 208 in the RREQ message. Station radio 204 (station B) and station radio 206 (station C) have indirect paths to the destination 208. Specifically, station radio 204 (station B) can only indirectly communicate with the destination via station radio 202 (station A) and is one step removed from having a direct communication path with the destination 208. Station radio 206 (Station C) can only indirectly communicate with the destination 208 via both of the radio stations 204 and 202. Station C is two steps removed from having a direct communication path with the destination 208. Other station radios may be provided with additional direct and indirect paths to the destination.

In the example of FIG. 3, multiple and redundant communication paths or routes are present for the source radio 200 to communicate with the destination 208. If, for example, the communication path between the source radio 200 and the station radio 202 (station A) becomes unavailable, the source radio 200 can re-route communications through radio B or C to reach the destination 208. If the communication path between the source radio 200 and the station radios 202 and 204 (stations A and B) become unavailable, the source radio 200 can re-route communications through radio C, or perhaps still other station radios, to reach the destination. Mesh networks of this type can capably address many contingent situations with communication paths becoming unavailable for practically unpredictable reasons, while still practically ensuring that data can be transmitted to the destination 208. In order to manage these issues, however, the source radio 200 needs some intelligence regarding the states of the various possible communication paths (i.e., whether certain paths are available or unavailable) at any given point in time, such that the communications protocol can take the availability or unavailability of communication paths into account. Thus, in response to an RREQ message sent by the source radio 200, each station radio 202, 204, 206 replies with an RREP message indicating available paths with associated path metrics.

In an exemplary embodiment, the metric number 0 may indicate that the station radio receiving the RREQ is the same device as the destination corresponding to the RREQ.

In one exemplary communications protocol, the metric number 1 may indicate a direct path between the station radio receiving the RREQ and the destination corresponding to the RREQ. In the example shown in FIG. 3, station 202 (station A) is therefore assigned the metric 1. If the source radio 200 that originates a RREQ message receives a RREP message from the station radio 202 returning the metric number 0 in the RREP message, the source radio 200 can know that the shortest possible path to the destination 208 is available for use.

Continuing with the same example, the metric number 2 may indicate that the station radio receiving the RREQ message is one path removed from the destination corresponding to the RREQ. Thus, in the example shown in FIG. 3, the source radio 204 is assigned a metric of 2. If the source radio 200 that originates a RREQ message receives a RREP message from the station radio 204 returning the path metric of 2, the source radio 200 can know that the path available through the station radio 204 would involve one other station radio (station radio 202 in the example shown) before reaching the desired destination 208.

Further continuing with the same example, the metric number 3 may indicate that the station radio receiving the RREQ message is two paths removed from the destination corresponding to the RREQ. Thus, in the example shown in FIG. 3, the source radio 206 is assigned a metric of 3. If the source radio 200 that originates a RREQ message receives a RREP message from the station radio 206 returning the path metric of 3, the source radio 200 can know that the path available through the station radio 206 would involve two other station radios (station radios 204 and 202 in the example shown) before reaching the destination 208.

It should now be apparent that a station radio assigned with a path metric number of 4 would be three paths removed from the destination, a station radio with a path metric of 5 would be four paths removed from the destination, etc. Such a protocol, like the mesh network itself upon which it operates, is scalable to any number n depending on the size of the mesh networks and number of radio devices in the possible communication routes to a destination.

The assigned path metric to possible destinations may be stored in a lookup table in the memory of the radio devices. For any given radio, different path metrics may be assigned for various possible destinations in the network. For example, the same radio may be assigned a path metric of 1 to one destination, but a path metric of 2 or 3 to another destination. Alternatively stated, the relevant path metric depends on the destination requested. Thus, when a station radio receives an RREQ message, it can retrieve the appropriate path metric from the lookup table that corresponds to the destination identified in the RREQ message.

In an exemplary embodiment, any station radio sending an RREP to a source radio may retrieve the metric corresponding to the requested destination and include the metric in the RREP message sent back to the source radio.

The path metric values themselves may be assigned either manually or automatically. For auto-path detection networks of the type described, each radio determines, via periodic communication with the other radios, its distance from possible destinations in the network, either as originally installed or as subsequently modified. That is, the radio devices may detect and learn new routes as newly added radios are installed, and may accordingly deduce the appropriate path metrics, possibly by sending RREQ messages and processing RREP messages from existing devices on the network. If a newly installed radio is given information regarding path metrics from responding station radios in RREP messages, the path metrics from the newly installed radio can be inferred. In such a situation, path metrics may be automatically assigned and updated by the radio devices.

While an exemplary on demand distance vector protocol and path metrics therefore have been described, it is contemplated that other alternative path metrics may be used to indicate a relative desirability of multiple signal transmission paths that may be available at any given moment in time. While in an exemplary embodiment the path metrics are preferably integer numbers and are bounded so that the location of RREQ forwarding window can be positively established, other variations, are possible. Non-integer number values, as well as alphabetical letters, graphics or symbols may be used to indicate path metrics. Likewise, actual distance values between radios, where known or otherwise detected by the radio devices, may be utilized as path metrics with similar effect to identify the shortest or most effective path routes available. Approximations and calculations may also be used to assign or update path metrics if desired. Finally, other metrics besides distance may be utilized to determine preferred paths of communication (i.e., communication routes) from any given source radio to any given destination. For example, radio path quality, radio data throughput, radio path congestion etc., may be used or taken into account when determining path metrics.

Regardless of the path metrics utilized or how the metrics are implemented, the path metrics may allow the source radio that sends an RREQ message to compare metrics and decide to correspond peer-to-peer with one of the radios returning a RREP message having the best path metric. That is, based on the RREP messages received, the source radio may establish point-to-point communication with a specific, preferred one of the station radios for more effective and reliable communication of messages on the network along a preferred path having the best metric. In the exemplary distance vector protocol discussed above, amongst multiple available paths to choose from, as determined by RREP messages received and the corresponding metrics, the shortest route is the route of choice and the source radio will pursue that path. Quicker and more reliable communication of data packets will result. Such protocols, while beneficial in many ways, tend to present additional challenges that are not necessarily present in other types of communication networks.

Specifically, when there are multiple station radio devices in the network within receiving range of a source radio broadcasting an RREQ message, all the station radio devices receiving the RREQ message will respond appropriately, as they should. However, this tends to result in a number of different RREP messages being sent from the station radios at more or less the same time. Consequently, one or more of the RREP messages may clash with one another and prevent the source radio from processing the entirety of the RREP messages sent. Especially as the number of station radios increases, the source radio may ultimately receive and process only a small fraction of the returning RREP messages. It is also possible, although perhaps unlikely in a well designed network, that none of the RREP messages will be received by the source radio. Regardless, the best available route to the destination requested in the RREQ message, typically the shortest route through the network, may become undesirably "lost" in a storm of RREP messages. This leaves the source radio with route choices, based on the RREP messages actually received and processed, that do not include the best routes actually available. The source radio cannot pursue paths that are not made known to it.

Further problems are presented when multiple station radios that do not have an available path to the destination may forward the RREQ message at approximately the same time as the RREP messages are being sent by other station radios. One or more of the forwarded RREQ messages may also prevent the source radio from receiving one or more of the RREP messages, with identical results to those discussed above, namely the source radio does not receive RREP messages for superior routes that were sent, but not received, by the source radio. Such issues with nearly simultaneous transmission of RREP and forwarded RREQ messages, and limited ability of the source radios to receive and process them, may cascade through the entire network. Selection of suboptimal communication routes can and will result, and overall performance of the communications network and system may suffer. The effects of poor system performance becomes more pronounced as the size and the complexity of the network grows.

Figure 4:
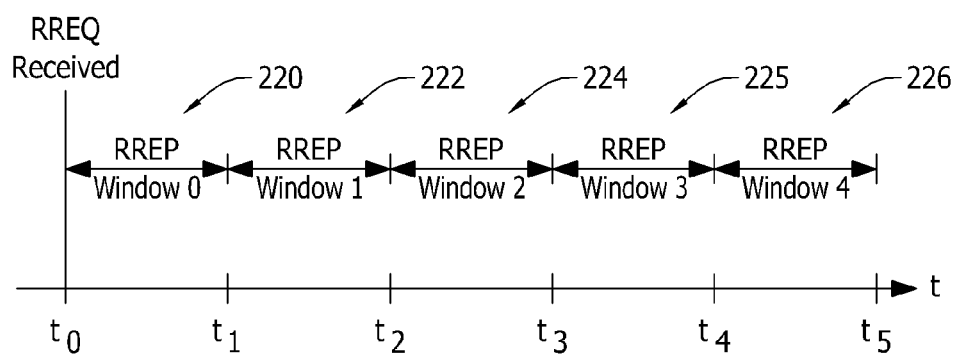
FIG. 4 illustrates a prioritized communications protocol for coordinating communications between the radios shown in FIG. 3.

FIG. 4 schematically illustrates an exemplary protocol timing chart for a control algorithm (described below) that facilitates a more effective communication protocol for on demand routing protocol systems. As will be described in detail below, the timing algorithm avoids the difficulties described above in a number of ways by prioritizing the transmission of RREQ and RREP messages to avoid colliding messages concerning preferred paths. By delaying transmission of certain RREP and forwarded RREQ messages, as determined by the protocol priority, it can be largely ensured that a source radio may receive and process every pertinent RREP, as well as practically all of the forwarded RREQ messages, regardless of how many station radios are actually involved.

More specifically, and as further described in some detail below, the timing protocol includes delaying transmission of RREP messages according to the respective path metrics of the station radios so that RREP messages advertising a more favorable path (i.e., a better path metric for an available route to destination) are sent earlier than RREP messages advertising a less favorable path. Thus, RREP messages having a metric path of 0 are sent before RREP messages having a metric path of 1, and RREP messages having a metric path of 1 are sent before RREP messages having a metric path of 2, etc. RREP messages may be sent in predetermined time windows, such that transmission of RREP messages with less optimal path metrics are delayed in time. As such it is ensured that RREP messages with the optimal path metrics cannot collide with other RREP messages. The RREP messages with the best path metrics will accordingly be received by the source radio, and may be taken into account for managing communications.

FIG. 4 illustrates the basic timing considerations of an exemplary prioritized communications protocol that accomplishes these benefits. In FIG. 4, the horizontal axis represents a passage of time t beginning from time $t_0$ when a RREQ message is received by the station radios. As can be seen in FIG. 4, the protocol involves multiple and different time windows for the station radios to respond and reply with RREP messages. The time window in which a given station radio will reply depends on its path metric for the requested destination in the RREQ.

As shown in FIG. 4, a first time window 220 is established between time $t_0$ and a subsequent time $t_1$. This time window 220 is referred to as window 0 in this example, and any radio able to respond with a path metric of 0 (e.g., in the destination station in FIG. 3) is instructed to respond in this time window 220. The duration of the window 220 may vary in different embodiments, but in general is sufficiently long for the destination station to respond with a 0 path metric, but not more. Also, the radio with such a path metric 0 (the destination) should generally respond without any intentional delay once the RREQ is received at time $t_0$. As there is only one destination station, there is (at most) one 0 metric station radio responding there is no potential for colliding RREP messages.

As also shown in FIG. 4, a second time window 222 is established between time $t_1$ and a subsequent time $t_2$. This time window 222 is referred to as window 1 in this example, and any radio able to respond with a path metric of 1 (e.g., station radio A in FIG. 3) is instructed to respond in this time window 222. The duration of the window 222 may vary in different embodiments, but in general is sufficiently long enough for any station radio able to respond with a path metric of 1 to do so. The window 222 follows the window 220, such that any station radio responding in the window 222 will be delayed from responding at least by an amount of time equal to the duration of the window 220.

A third time window 224 is established between time $t_2$ and a subsequent time $t_3$. This time window 224 is referred to as window 2 in this example, and any radio able to respond with a path metric of 2 (e.g., station radio B in FIG. 3) is instructed to respond in this time window 224. The duration of the window 224 may vary in different embodiments, but in general is sufficiently long enough for any station radio able to respond with a path metric of 2 to do so. The window 224 follows the windows 220 and 222, such that any station radio responding in the window 224 will be delayed from responding at least by an amount of time equal to the duration of the window 220 and the duration of the window 222.

A fourth time window 225 is established between time $t_3$ and a subsequent time $t_4$. This time window 225 is referred to as window 3 in this example, and any radio able to respond with a path metric of 3 (e.g., station radio C in FIG. 3) is instructed to respond in this time window 225. The duration of the window 225 may vary in different embodiments, but in general is sufficiently long enough for any station radio able to respond with a path metric of 3 to do so. The window 225 follows the windows 220, 222 and 224, such that any station radio responding in the window 225 will be delayed from responding at least by an amount of time equal to the duration of the window 220, the duration of the window 222, and the duration of the window 224.

Any number of windows n could be provided to accommodate radio devices having metrics of 0 through n−1, with each window defining a discrete time slot for station radios with different path metrics to respond with RREP messages. As FIG. 3 illustrates a network including three stations and 3 path metrics n is set to 4 in the example of FIG. 4 and accordingly four windows are defined up to and between times $t_1$, $t_2$, $t_3$ and $t_4$. The direct path will be realized immediately via the window 0 response in this example, the next best path metrics will be reported at a later point in time via the window 1 in this example, and so on until all the station radios that can respond with RREP messages have done so. In such a system, by prioritizing the sending of RREP messages having better path metrics and delaying transmission of RREP messages having lesser path metrics, colliding RREP messages that may obscure the availability of routes having better path metrics is avoided entirely.

As FIG. 4 also shows, a fifth window is established between time $t_4$ and a subsequent time $t_5$. This time window 226 is referred to as an RREQ window in this example, and any station radio that does not have an available path to the destination is instructed to forward the RREQ in this time window 226. The duration of the window 226 may vary in different embodiments, but in general is sufficiently long for any station radio able to forward the RREQ to do so. The window 226 follows the windows 220, 222, 224 and 225, such that any station radio responding in the window 226 will be delayed from responding at least by an amount of time equal to the cumulative duration of the windows 220, 222, 224 and 225. As such, a forwarded RREQ message will not be sent until after all possible RREP messages have occurred in the prior windows 220, 222, 224 and 225 and any possibility of a forwarded RREQ message colliding with an RREP message and obscuring the availability of routes having better path metrics is avoided entirely.

Figure 5:
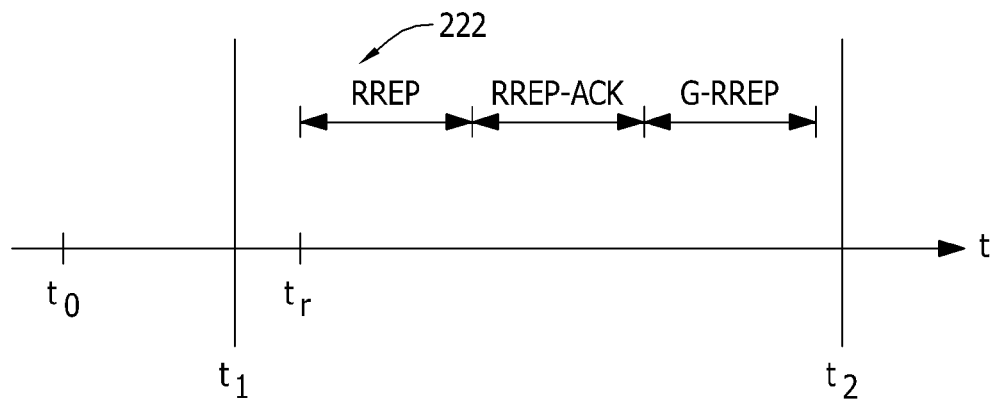
FIG. 5 is a detailed view of a portion of the protocol illustrated in FIG. 4.

As illustrated in FIG. 5, further improvements are facilitated by introducing random delay in transmission of RREP messages in each of the n windows to reduce a possibility of clashing RREP messages regarding paths of the same metric. Thus, in the example of FIG. 4, if more than one station radio sends a RREP message with a path metric of 1 in the window 222 a possible collision of RREP messages can occur. To address this, a small, randomly determined delay is added between the start of the window 222 (time $t_1$ in this example) and transmission of the RREP. The delay is indicated as $t_r$ in FIG. 5, and results in the RREP message being sent a time of $t_1$ plus $t_r$ rather than immediately at time $t_1$.

Random number generators and the like may be used to determine the actual amount of delay, and because of the random nature of the delay for each responding radio, the likelihood of any two station radios sending entirely colliding RREP messages is effectively minimized. The delay is relatively small, and is contemplated to be a fraction of the duration of the window 220 or 222, which need not be the same in all embodiments. Because of the random delay there will be some separation in time between the RREP messages sent in the window 222 by different station radios that will allow the source radio to receive and process them. In contemplated embodiments, the random delay may include zero delay such that a message sent in the window 220 may be sent immediately at time $t_1$. Similar random delay features may be provided in all the windows 1 though n in any given network.

FIG. 5 illustrates further optional features that may be included in the protocol. While FIG. 5 illustrates the exemplary window 222 only it is contemplated that all the windows 1 through n would be setup similarly. More specifically, the protocol may include, in addition to transmission of an RREP message by a station radio, an optional acknowledgement message (RREP-ACK) transmitted back from the source radio, and an optional gratuitous reply (G-RREP) from the repeater radio to the destination radio to establish the reverse route in anticipation of bi-directional communication between the source and destination. Thus, confirmation may optionally be provided that communications were received by the source radio, and a reverse route from the destination to the source may be proactively established. The length of the time slot 222 should account for the presence or absence of RREP-ACK messages and G-RREQ messages in the protocol, and also account for the delay introduced prior to generation of the RREP by a station radio. The window 222 should be sufficiently long to accommodate the necessary message transmissions and the amounts of delay. Ideally, all message transmissions should begin and end within the confines of the window. Otherwise, messages could spill over into the next successive window and present possibilities for message collision. The length of windows 1 through n may be selected to be the same or different in various embodiments.

Figure 6:
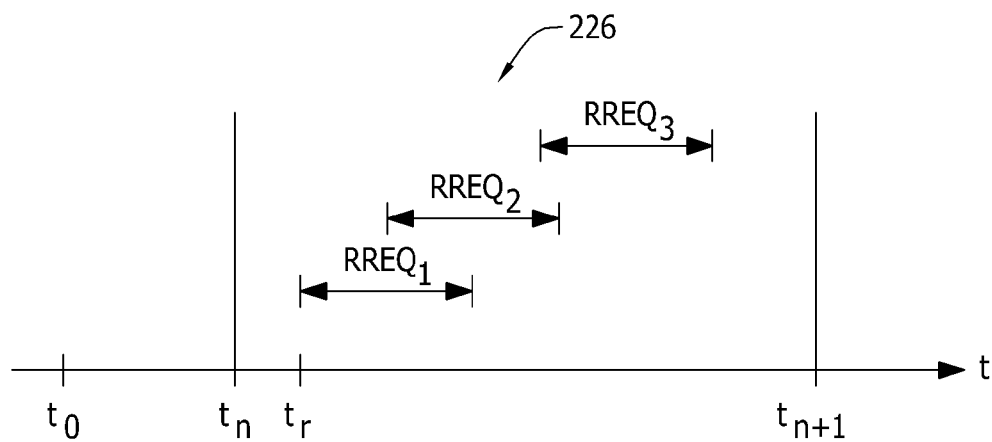
FIG. 6 is a detailed view of another portion of the protocol illustrated in FIG. 4.

As shown in FIG. 6, still further performance enhancements are provided by delaying forwarding of any RREQ messages in the n+1 window 226 by a randomly determined amount, indicated by the amount $t_r$. The delay may be determined in a similar manner to the delay discussed above in the window 220 (FIG. 5). The random delays are individually applied to the station radios that need to forward the RREQ message. Introducing randomly distributed delays in forwarded RREQ messages to reduce a likelihood of RREQ messages sent by different station radios conflicting with one another. The duration or length of window n+1 may be adjusted to desired forwarded RREQ performance.

Figure 7:
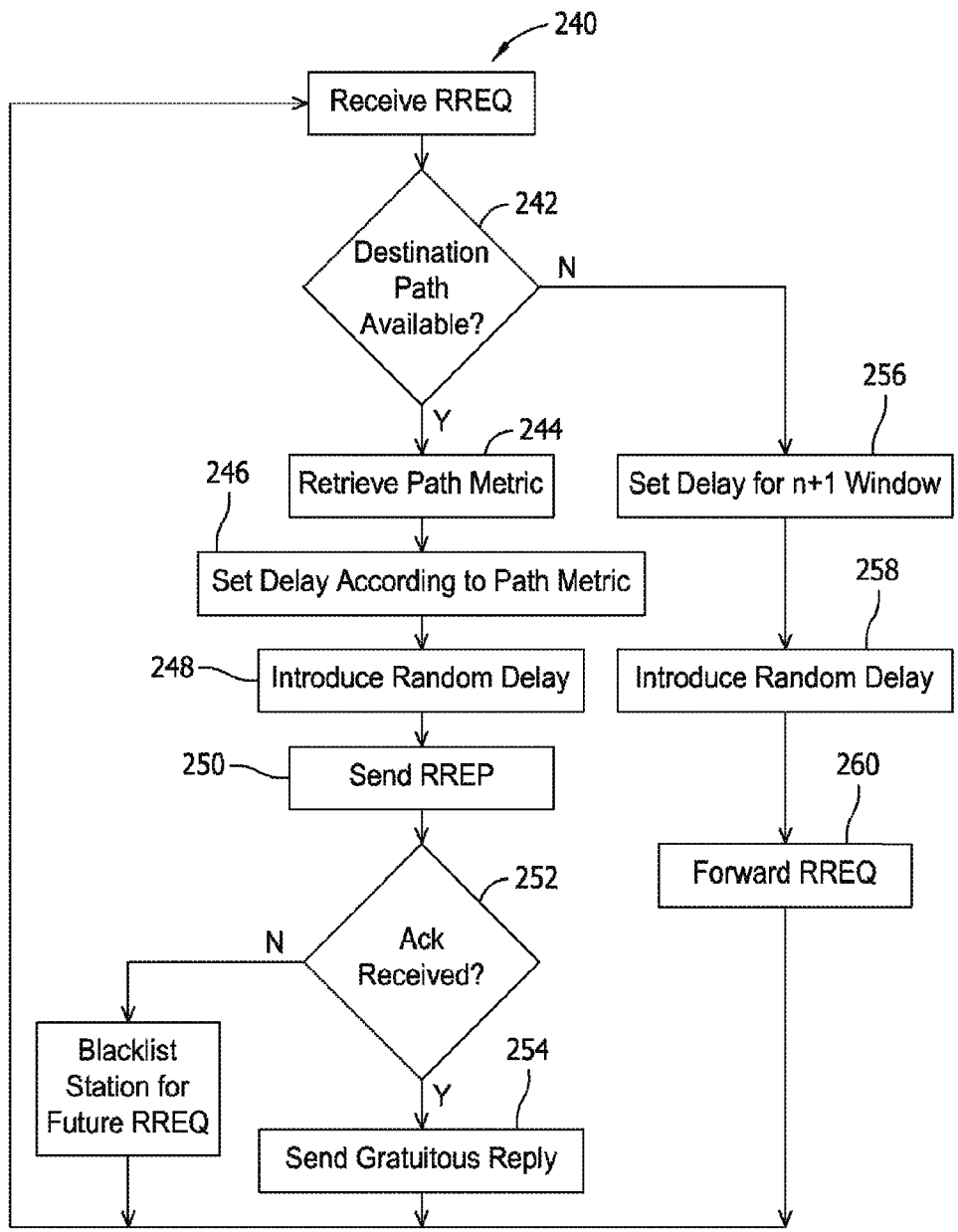
FIG. 7 is flowchart of an exemplary algorithm implementing the prioritized communications protocol shown in FIGS. 3-6.

FIG. 7 illustrates an exemplary implementation of the prioritized communications protocol described above. The algorithm may be stored onboard and executed by each of the processor-based controls of the radio devices 100 (FIG. 1). In one contemplated embodiment, each radio device in the mesh network is capable of running the algorithm as all devices are generally capable of use as source and station radios to send messages. In other embodiments, however, the algorithm could be run only on selected ones of the radio devices in the network.

As shown in FIG. 7, the algorithm begins when an RREQ message is received at step 240. Once the RREQ message is received, the radio device determines whether a path to the destination is available at step 242. The availability or unavailability of a path may be stored in a lookup table that is periodically updated as the radios communicate. Alternatively, the availability or unavailability of a path could be determined or made known in another manner, and used to evaluate step 242.

If a destination path is available, the path metric is retrieved at step 244. The path metric may be retrieved by the lookup table described above or determined in the manner described above or in another manner. Once the best available path and path metric is known, the radio device sets the delay for response according to the metric at step 246. For 0 path metrics, the RREP can be sent without delay as there will be at most one sending device, which is the requested destination station. For indirect paths (metrics greater than zero), the radio device, based on the path metric, can select which of the windows 1 through n in which to respond. Transmission of the RREP messages are prioritized or appropriately delayed as described above.

As shown at step 248, an additional and randomly determined delay may optionally be introduced to avoid colliding RREP messages of different radios having the same metric and reporting in the same window as discussed above. After introduction of the additional delay at step 248, if any, the RREP message is sent at step 250.

As shown at step 252, optionally, and where applicable, the radio device may await acknowledgement of the RREP by the source radio. If no acknowledgement is received, the source radio which sent the original RREQ may be black-listed by the station sending the RREP (this is normal operation of the AODV protocol). If acknowledgement is received, a gratuitous reply may be sent to the destination radio indicated in the route request as shown at step 254. The device then returns to step 240 and awaits another RREQ message from a source radio.

If at step 242 it is determined that no path to the destination is available, the radio may set a delay 256 to forward the RREQ until the n+1 window begins. Optionally, and as shown at step 258, a randomly determined delay is introduced to avoid collision of forwarded RREQ messages. At step 260, the forwarded RREQ message is sent. The device then returns to step 240 and awaits another RREQ message from a source radio.

Having now described the algorithm, it is believed that those in the art could program the algorithm or otherwise implement the algorithm in processor based controls without further explanation. Implementation of the algorithm in firmware and/or hardware is believed to be within the purview of those in the art. The algorithm could be communicated to the radio devices over the air in the communication network as a firmware or software update, or could alternatively be provided to the radio devices prior to installation in the network.

Figure 8:
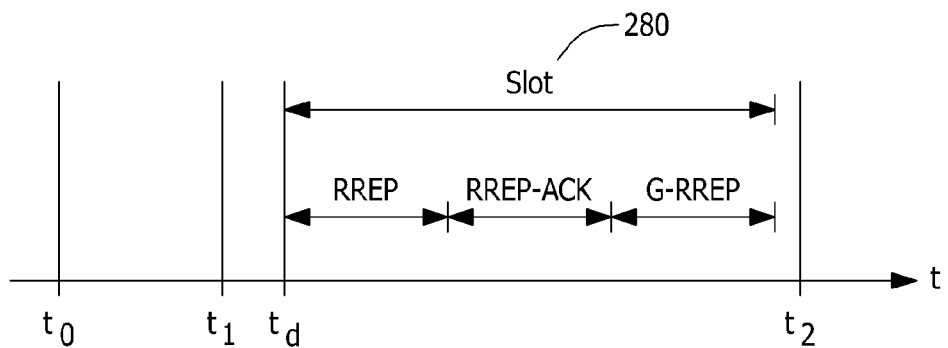
FIG. 8 illustrates an alternative protocol technique to that shown in FIG. 5.

FIG. 8, illustrates an alternative manner of additionally delaying transmission of RREP messages in each of the n windows to reduce a possibility of clashing RREP messages regarding paths of the same metric. Thus, in the example of FIG. 8, if more than one station radio sends a RREP message with a path metric of 1 in the window defined between times $t_1$ and $t_2$, a possible collision of RREP messages can occur. To address this, the window may be sub-divided into multiple time slots, each of duration sufficient to allow transmission of the RREP as well as optional RREP-ACK and G-RREP messages. The RREP message is then transmitted in one of these slots.

One such slot is shown via reference 280 in FIG. 8 and extends between a time td and the end of the RREP plus optional RREP-ACK and G-RREP messages. The time td is subsequent to time t1 wherein the response window starts, and hence there is a built-in delay between the beginning of the response window at time t1 and the beginning of the RREP message at time td. The delay results in the RREP message being sent a time of $t_1$ plus $t_d$ rather than immediately at time $t_1$. By defining multiple slots with different $t_d$ values, and then randomly selecting one of the multiple slots to send the RREP message in, effectively randomized delays in RREP messages by different radios reporting the same path metric is made possible.

If the time delay $t_d$ is selected to be an integer multiple of the slot time (i.e., the cumulative amount of time required to transmit the RREP, and if configured to receive the optional RREP-ACK, and if further configured to send the optional G-RREP) it can be ensure that the time slots that are randomly selected will not overlap at all. For example, the delay time $t_d$ for each respective one of the multiple slots may be determined by multiplying the slot time by a random integer in the range 0-m−1, where m is a value that ensures that the slot m will not overlap the subsequent window.

Figure 9:
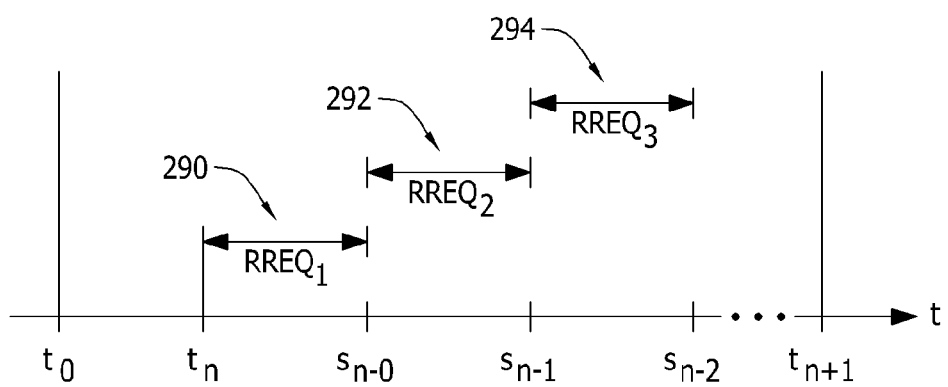
FIG. 9 illustrates an alternative protocol technique to that shown in FIG. 6.

FIG. 9 illustrates an alternative manner of additionally delaying transmission of forwarded RREQ messages the RREQ forwarding window to reduce a possibility of clashing RREQ messages. In the example of FIG. 9, the RREQ window may be sub-divided into multiple time slots 290, 292 and 294 with each of the forwarded RREP messages being transmitted in one of these slots. The slots can be selected so that none of the RREP messages overlap. The RREQ window can be selected to be long enough to allow all possible radios to forward RREQs in the RREQ window.

The techniques shown in FIGS. 8 and 9 may be substituted for the techniques shown in FIGS. 5 and 6 and implemented in the algorithm of FIG. 7 at steps 248 and 258 to create additional delays in messaging to avoid clashing messages on the network 120.

Apart from the protocol methods explained above, further enhancements of communications on a frequency hopping mesh network are possible, whether in combination with the techniques described above or as stand-alone features to address still other issues. Such enhancements, described below, may be implemented with input/output devices such as the radio devices described above and associated networks and systems such as those described above.

In a multi-path communications network of the type described, instantaneous signal strength has sometimes been utilized to determine link suitability for transmission of messages between neighbouring radio devices in the network. For the purposes of discussion herein, a neighbouring radio device is a radio device in the communication network that is in signal range of a source radio, a station radio, or a destination radio as described above. As such, neighbouring radios may themselves be source radio devices, station radio devices, and destination radio devices as messages are sent on the network. Regardless, for any given radio device on the network, a communication link will exist between it and at least one other radio device within signal range, referred to herein as a neighbouring radio. In mesh networks of the type described, it is desirable that any given radio device has some ability to evaluate the reliability of the links to the neighbouring radio devices, and therefore can intelligently decide to utilize only reliable paths for message transmissions, and to disregard unreliable links that may be problematic if utilized to send messages.

In one scenario, each time a data packet is received from a neighbouring radio in the network, the received data packet is tagged by the receiving radio with the channel (frequency on which the message was communicated) and a received signal strength indication (RSSI). Further, the data packet is processed by the receiving radio device to determine the network address of the transmitting radio in the network, and thus may determine which of the neighbouring radio devices transmitted any given message.

Such instantaneous tagging of data packets by channel and RSSI, as well as processing of data packets to determine the neighbouring radio that transmitted the message, may occur regardless of whether the receiving radio is the destination radio device for the data packet or not. In a frequency hopping, spread spectrum topology, every radio device transmits on all channels in the network, and over time each radio will be able to identify the neighbouring radios within signal range and their RSSI values on the various channels available in the network. The RSSI values can then be utilized as indicators of link reliability for routing messages through the network. As such, the communication signal paths, referred to herein as links, between neighbouring radios having unacceptable RSSI values will not be utilized as message routes. Alternatively stated, for any given radio device, only links corresponding to neighbouring radios having acceptable RSSI values will be utilized to route messages through the network.

A possible technique to determine the suitability of a link to a neighbouring receiving radio for use by any given radio device, is to average the instantaneous RSSI values for messages transmitted by the neighbouring radio to the given radio device across the various channels available, and to use that average RSSI value as a basis to evaluate the reliability of the link. For example, in such an embodiment, only links to neighbouring radios having an average RSSI value above a particular threshold could be designated as reliable for use to transmit a message, and links having average RSSI values below this threshold may be deemed unreliable and may not be utilized for routing of message transmissions.

The threshold to which the average RSSI value is compared may be set at a value, for example, that is above the receiver sensitivity value for the radio devices in the network. The receiver sensitivity value is the minimum signal strength where a given radio device is able to receive a transmission from a neighbouring radio device. By setting the threshold to be greater than the radio receiver sensitivity (which may be the same or different amongst the radio devices in the network), the established links with neighbouring radio devices have some "signal margin". Because of the signal margin, even though the links to neighbouring radio devices may have an average RSSI value that is below the threshold, transmitted messages may still be received by the neighbouring radio devices via one or more of the links established with the neighbouring radio devices.

Averaged instantaneous RSSI values, however, can be poor indicators of link suitability in an environment wherein multipath fading is apparent. Multipath fading refers to a situation wherein a transmission of a radio wave between any neighbouring transmitting radio device and a receiving radio device may simultaneously follow more than one path between the transmitting radio device and the receiving radio device. Multipath fading may be expected for communication between two radio devices where there is no direct path or link between them, but instead more than one indirect path between them exists on the network. Apart from a larger network, multipath fading may also occur, however, between a single transmitting radio device and a single receiving radio device. In such a case, multipath fading may be due to the transmitted radio signal taking more than one route between the transmitting radio device and the receiving radio device, with such multiple routes resulting from the radio signal being reflected by various objects in the environment.

The different indirect paths between the transmitting radio and the receiving radio may result in radio waves transmitted by different neighbouring radios to reach the receiving radio out of phase with another. This, in turn, may result in the out of phase signals cancelling one another (i.e., fading of the signal). It is also possible that the phases of radio waves arriving from different paths, via different neighbouring radios, may reinforce one another. Either way, the instantaneous average RSSI values for the neighbouring radio devices can be deceptively high (or low) and not truly represent the suitability of the communication link between the neighbouring radio and the receiving radio. Over the entire frequency band of the network, the instantaneous RSSI values may change considerably for the same link with a neighbouring radio, especially when deep multipath fading occurs at certain frequencies. Given such changes in the instantaneous RSSI values, it is possible that a situation will emerge when averaged RSSI will indicate a reliable path when none actually exists.

Figure 10:
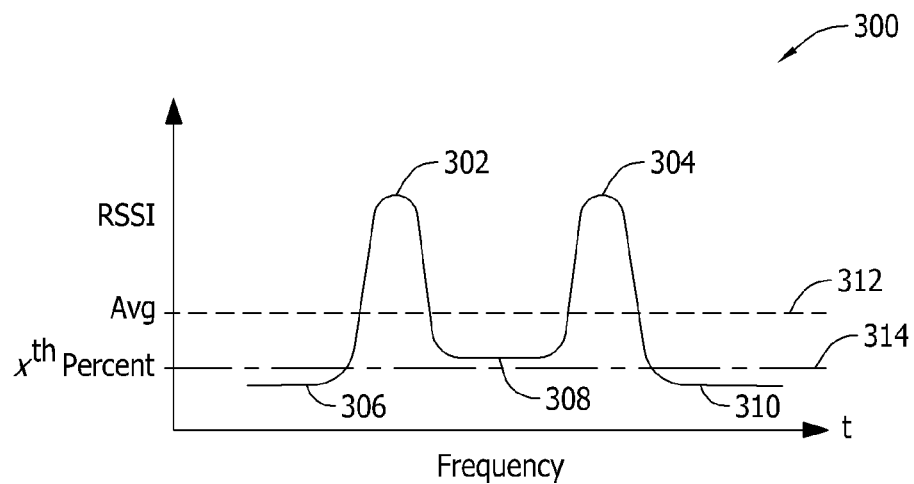
FIG. 10 is a first exemplary received signal strength indication (RSSI) versus frequency plot illustrating link suitability determination for a communications link established between neighbouring input/output devices.

For example, FIG. 10 illustrates an exemplary RSSI versus frequency plot 300 for one of the radio devices in a network with respect to a link established with a neighbouring radio, and illustrates an averaged RSSI calculation that may be used to determine the suitability of the communications link for use in transmitting messages. The frequency channels are plotted along the x axis, and the RSSI signal strength is plotted on the y-axis. As shown in FIG. 10, the RSSI signal strength varies considerably with frequency (i.e., the channel on which the transmission occurs), such that the received RSSI indication for any given message may vary considerably depending on which channel the messages are sent from the neighbouring radio. In the example shown, the RSSI reaches its maximum level at two small bands of frequencies shown at 302 and 304, while being greatly reduced in other frequency bands shown at 306, 308 and 310. Thus, the RSSI over all frequencies has a peak and valley-type plot with two peaks of strong RSSI separated by significant drop offs on either side of each peak. The drop offs shown in FIG. 10 may be the result of multi-path fading from communications travelling over different communication paths, and the peaks may reflect reinforcement of communications travelling over different communication paths. RSSI versus frequency plots for other neighbouring radios may be expected to be different from the representative plot shown in FIG. 10. That is, RSSI peaks may be observed on different channels for other neighbouring radios, RSSI drop-offs may be observed on different channels for other neighbouring radios, or perhaps the RSSI plot may be relatively constant and stable if multipath fading is not present for other neighbouring radios.

The averaged RSSI calculated for all of the channels is shown with the hyphenated line 312. While averaged RSSI may be an effective indicator when the RSSI values are relatively stable across the frequency band, as shown in FIG. 10, because of the multipath fading issues that present the peaks and drop-offs in the actual RSSI, the averaged RSSI 312 is a poor indicator of link suitability in these circumstances. The actual RSSI for the majority of the channels is actually below the calculated average RSSI 312. When the averaged RSSI is compared to the predetermined threshold, the average RSSI may be above the threshold, and as a result the link to the neighbouring radio is made available for message communication when it should not be, with suboptimal effect on the associated communications network.

Specifically, in the example shown in FIG. 10, because the averaged RSSI is higher than the actual RSSI for the majority of channels available, the signal margin will not be sufficient for messages to the neighbouring radio to be successfully received when sent on those channels. The link to the neighbouring radio may established, but because of a deep multipath fade, any attempted transmission via some of the affected channels will be below the receiver sensitivity, which may be set as the threshold for comparison with the averaged RSSI, for the neighbouring radio. Consequently, messages will be sent on the link by virtue of a sufficiently high averaged RSSI that is above the threshold, but not actually received by the neighbouring radio on these faded channels.

As the messages are sent, but not received on the faded channels, no acknowledgement message will be transmitted from the neighbouring radio back to the transmitting radio. This, in turn, will cause the transmitting radio to retransmit the message to the neighbouring radio on a different channel. In one contemplated embodiment, the channel selected for the re-transmitted message is not the next numeric channel number from the previous channel used, but rather is another channel somewhere else in the available frequency band. As one example, the selection of the next channel could be randomly determined or, as another example, selected from a list where the channel numbers have been pre-scattered in a pseudo-random fashion across the band. Importantly, because the fade occurs for several numerically adjacent channels in the example shown in FIG. 10, the retransmitted message will likely fall outside of the fade region and the re-transmitted message is more likely to be received by the neighbouring radio. It is possible, however, that multiple messages will be transmitted, but not received, by the neighbouring radio because even the randomly determined or pseudo-randomly determined selection of the next frequency may likewise be affected by multi-path fading issues. Such issues are likely to re-occur over time, and when multiple radios are effected, the speed and performance of the network can be degraded considerably.

As noted above, different radio devices in the network may experience similar multi-path fading issues to greater or lesser extents, while some radios may not be affected by multi-path fading issues at all. Whether or not any given radio device will experience these issues is difficult to predict, and the issues are subject to change over time. Especially as the size of the communication network increases (i.e., the number of nodes increases), appreciable degradation of network communications may result if average RSSI were relied upon to select signal paths between neighbouring radio devices.

Aside from the issues noted above, the failure of a neighbouring radio to receive a transmitted message and send a return acknowledgement message may trigger the mesh network to automatically reconfigure itself. The reconfiguration can unnecessarily starve the network of bandwidth because of reconfiguration data being sent, and compound the issues noted above when radio devices are attempting to retransmit data messages at approximately the same time reconfiguration data is being transmitted. The reconfiguration may present reliability and performance issues for the transmission of user data. Instability of the network may also arise due to frequent reconfiguration events.

In addition to the problems noted above, in some systems, network operators are provided with interfaces that display RSSI values for selected portions of the network. The RSSI values may fluctuate by large amounts as the network operates when multi-path fading issues are present. This can be confusing to persons who are tasked with overseeing the network, and typically fails to provide meaningful data for purposes such as performing a radio survey or determining suitable locations to install antennas or other equipment that may improve network operation.

As also shown in FIG. 10, one benchmark that avoids the problem discussed above is to calculate the RSSI value that corresponds to the $x^{th}$ percentile level. The $x^{th}$ percentile level is shown in FIG. 10 as the line 314 and may be computed as a level wherein only x percent of the frequency channels would have an actual RSSI value lower than the $x^{th}$ percentile level. For example, in one contemplated embodiment, the $x^{th}$ percentile level may be set as the $10^{th}$ percentile level (i.e., x may be set to 10). As such, 90% of the available frequencies have an RSSI level above the $x^{th}$ percentile level (e.g., the $10^{th}$ percentile level) in this example. Of course, x may be set to other levels depending on specific preferences and requirements for certain communication networks, and as such may be greater and lower than 10 in other embodiments.

In one contemplated embodiment, the x value for the $x^{th}$ percentile level is predetermined and is hard coded in each radio device and therefore is a static (i.e., unchanging parameter) once the radio device is placed in service in the network. Since x is hard coded, the $x^{th}$ percentile level is automatically computed by the radio device as RSSI data tags are collected when messages are received, until a stable $x^{th}$ percentile level is reached. The $x^{th}$ percentile level in such an embodiment is transparent to the end user and requires no user input to operate. Of course, even in such an embodiment it may be possible to change the value x by via a software update.

In another embodiment, x may be a variable that is selected by a user such as a radio installer or network operator, such that sensitivity of the $x^{th}$ percentile level may be adjusted, selected or changed via operator input and preference. Such operator input may be provided via an appropriate software and/or hardware interface or selector in the radio device or a control element that allows the value x to be selected for multiple radio devices. In such an embodiment, once selected for a given radio or group of radios, the x value would remain static until changed by the operator. In such a scenario different x values could be provided for different radio devices in different portions of the network.

In still another embodiment, because RSSI values may vary over time and further may vary with each node in the network, the $x^{th}$ percentile level may be dynamically determined in a re-occurring fashion, whether on a periodic basis or non-periodic basis as the network operates. In such an embodiment, the $x^{th}$ percentile level may "float" over time in response to changes in RSSI values.

Regardless of which value x has been provided, selected, or otherwise determined, by computing the $x^{th}$ percentile level and using it as a benchmark for RSSI evaluation, it can be ensured that messages will be communicated only on reliable links with neighbouring radios. Specifically, by comparing the $x^{th}$ percentile level to a predetermined threshold level such as the receiver sensitivity discussed above, intelligent and accurate decisions may be made whether or not to utilize the link. If desired, the predetermined threshold level may include some signal margin as discussed above, but the link will only be utilized if the calculated $x^{th}$ percentile level for RSSI is above the predetermined threshold.

Unlike the averaged RSSI value 312, the $x^{th}$ percentile level 314 mitigates situations wherein the averaged RSSI value 312 deceptively (or wrongly) indicates RSSI levels across certain channels that are higher than they actually are. By utilizing the $x^{th}$ percentile level 314 instead, and further by comparing the $x^{th}$ percentile level to the predetermined threshold, a failure of a transmitted message to be received on any given link is considerably less likely on links having the calculated $x^{th}$ percentile level above the threshold, while also ensuring that links most affected by multi-path fading (i.e., links having calculated $x^{th}$ percentile level below the threshold) are not utilized to route messages. More reliable, faster, and stable network operation due to less frequent network configuration is therefore possible.

The $x^{th}$ percentile level may be considered another type of metric path indicator that may be used to select message routes and prioritize messages on the network. Messages may be sent on links having the $x^{th}$ percentile of RSSI values above the threshold level, but not on links having the $x^{th}$ percentile level below the predetermined threshold. Additionally, more than one value for x may be assigned and selectively applied for messages having different priorities.

The processor based controls described above may implement the determination of the $x^{th}$ percentile level, or in other embodiments the processor based controls may be provided with the x value to be used, and then accordingly route messages (or not) through link to neighbouring radios based on whether or not the current $x^{th}$ percentile RSSI level is above or below the threshold as messages are sent. It is believed that those in the art could implement the $x^{th}$ percentile RSSI level comparison in appropriately configured hardware and/or software without further explanation.

Figure 11:
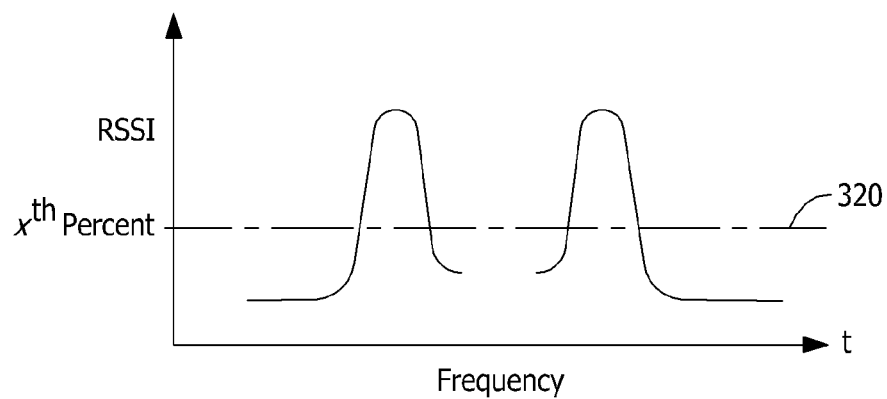
FIG. 11 is a second exemplary received signal strength indication (RSSI) versus frequency plot illustrating link suitability determination for a communications link established between neighbouring input/output devices.

An adoption of the $x^{th}$ percentile RSSI level as described above requires additional considerations described in relation to FIG. 11. FIG. 11 illustrates a situation wherein RSSI values for certain channels are not received via a link to a neighbouring radio. The frequency channels are again plotted along the x axis, and the RSSI signal strength is again plotted on the y-axis. The RSSI plot in the example shown resembles that shown in FIG. 10, but there is an ambiguity in FIG. 11 because the RSSI values in frequency band 308 shown in FIG. 10 are entirely absent in FIG. 11. Such a situation may occur for any given radio in a network either because no transmissions were made in the frequency band 308, or transmitted signals in the frequency band 308 were too weak to be received. As a result, and as shown in FIG. 11, RSSI data in FIG. 11 is missing and unknown.

A possible way to address the situation shown in FIG. 11 is to compute the $x^{th}$ percentile level using a low RSSI value for the missing channels. If this were done for the missing bands or channels, however, other problems may result, especially if the $x^{th}$ percentile level was calculated at a time when one or more of the missing channels is due to a lack of transmission on the corresponding frequencies. That, is the $x^{th}$ percentile level could be computed, but there could be channels where the computed $x^{th}$ percentile level would be inaccurate for certain channels in the missing frequency band. Most likely, the calculated $x^{th}$ percentile level would be artificially low if the missing channels were assigned a low value when in actuality the missing channels possess higher instantaneous RSSI values above the threshold, but this is simply not evident to the radio device because no transmissions have actually occurred on the missing channels by a neighbouring radio. As a result, the artificially low $x^{th}$ percentile level may fall below the predetermined thereshold, when it otherwise would not if more of the RSSI values were considered for the missing channels, and hence a link may be deemed unsuitable or unreliable when it actually is not. This, in turn, can lead to sub-optimal routing of messages in a network.

Therefore, to address the situation shown in FIG. 11, the $x^{th}$ percentile level can be initially computed using data only from the channels for which RSSI data is known. The missing frequency bands for which no data is available is therefore excluded from the $x^{th}$ percentile level computation. As such, for example, if the radio devices are configured to transmit on fifty channels, but RSSI values for only thirty of the channels are known, the $x^{th}$ percentile level is computed using only the known thirty channels, as opposed to computing the $x^{th}$ percentile level using all fifty channels but assuming a low value for the missing channels. The resultant $x^{th}$ percentile level computed with only the known RSSI values is shown as line 320 in FIG. 11, and comparing FIG. 11 to FIG. 10 it is seen that the $x^{th}$ percentile level 320 in FIG. 11 is higher than the $x^{th}$ percentile level 312 in FIG. 10. In other words, the $x^{th}$ percentile level 320 is higher than it would otherwise be if the missing channels having no known RSSI level were factored into the computation with a low RSSI value. When the $x^{th}$ percentile level 320 is utilized, which is based only on the channels wherein the RSSI level is known, stable RSSI indication may be provided to network operators even when there is some ambiguity regarding RSSI values for certain channels.

The technique shown in FIG. 11 may also be updated over time, and as messages are received on one of the channels, the formerly missing RSSI values may become known via the data tagging described above, and the $x^{th}$ percentile level may be recomputed using the additional RSSI values. The accuracy of the computed $x^{th}$ percentile level may accordingly self-adjust as RSSI level data regarding additional channels is received.

Figure 12:
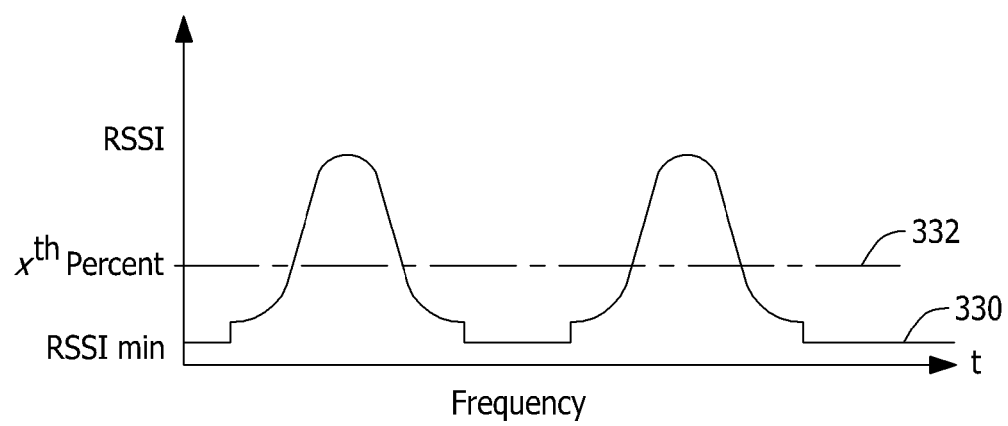
FIG. 12 is a third exemplary received signal strength indication (RSSI) versus frequency plot illustrating link suitability determination for a communications link established between neighbouring input/output devices.

FIG. 12 illustrates still another adaptation of utilizing the $x^{th}$ percentile level. If RSSI values are not eventually received on the missing channels, such as those described in relation to FIG. 11, RSSI values for the missing channels may then be assigned to a minimum value shown by the line 330. In the embodiment shown in FIG. 12, the minimum RSSI value is a low value corresponding to a value y that is less than the weakest signal strength the radio device is capable of receiving.

When the missing channels are assigned this value y, the resultant $x^{th}$ percentile level 332 is reduced from its prior level 320 (shown in FIG. 11). In an exemplary contemplated embodiment, the radio devices transmit on all of the available frequency channels in a pseudo-random, scattered manner, but will transmit messages on all of the available channels before re-transmitting a message on a frequency channel that has already been used. Thus, for example, for a radio device configured to transmit on fifty different channels, when the radio device is first installed it may first transmit on a pseudo-randomly determined channel z, and thereafter will transmit on the other forty nine channels (also in a pseudo-random fashion) before returning to transmit on the channel z. As such, it may be assumed that when the second transmission on frequency z occurs, all of the channels have been used for transmission, and the missing channels can be presumed to correspond to channels wherein the signal strength of messages sent on the missing channels were too weak to be successfully received. Hence, the minimum RSSI level y is assigned to the missing channels at a value less than the weakest signal strength the radio device is capable of receiving only after the radio device has been given an opportunity to receive transmissions on all the channels. There is no ambiguity regarding the actual RSSI levels for the various channels at this point.

Figure 13:
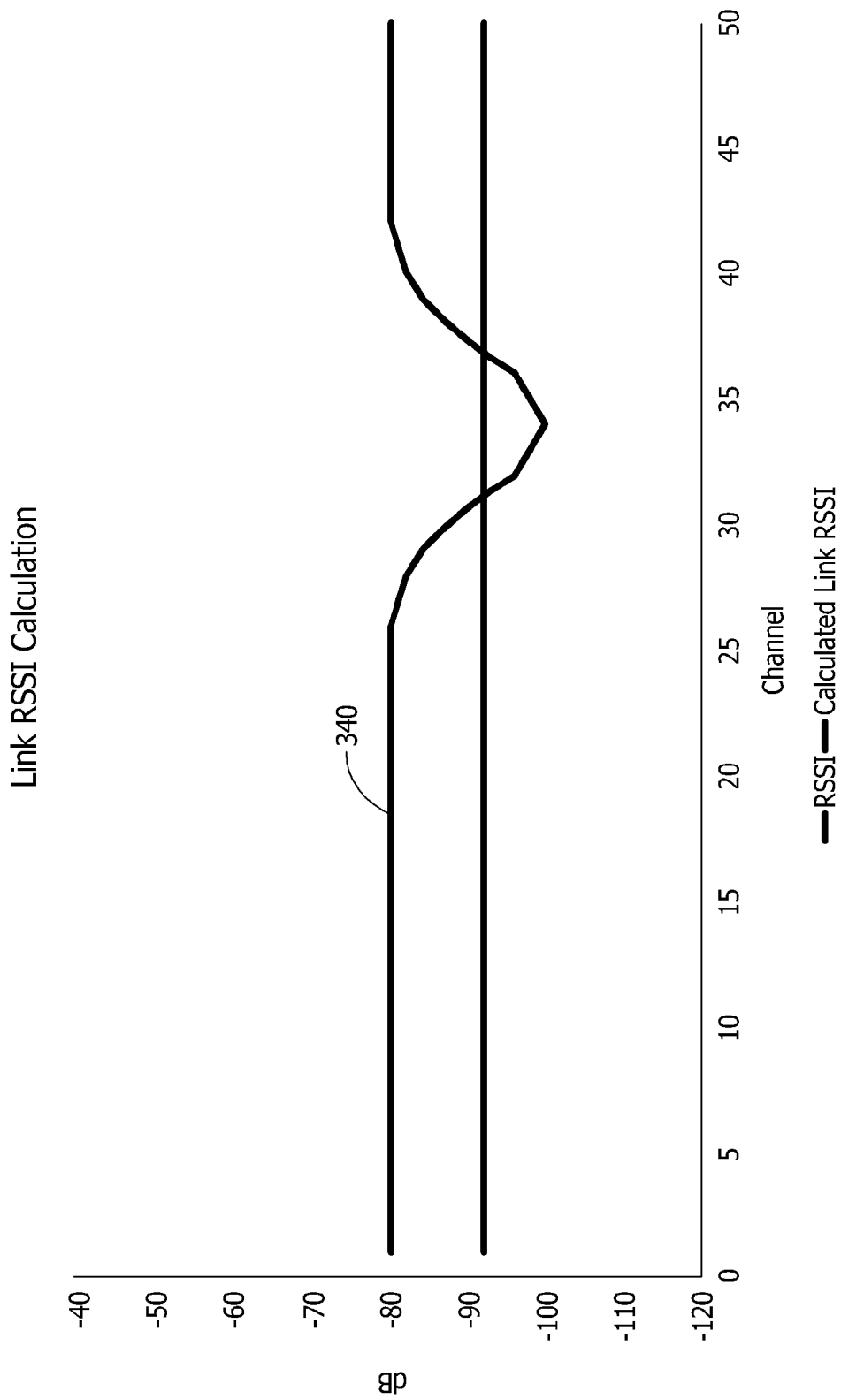
FIG. 13 illustrates an exemplary representative RSSI calculation for a communications link established between neighbouring input/output devices.

FIG. 13 illustrates an exemplary representative RSSI calculation employing one or more of the techniques described above. It is seen in this example that the actual RSSI signal strength, shown by the line 340, is relatively stable up to about channel 25 wherein multipath fading begins to occur, and multipath fading is observed at channel 34. By about channel 43, the mutli-path fading is no longer observable and the RSSI signal strength is again stable.

In the example shown in FIG. 13, x is set to the value 10, and the calculated, representative $x^{th}$ percentile RSSI level determines a level wherein the actual RSSI of 90% of the channels are above the representative RSSI. When the $x^{th}$ percentile RSSI level is used as a measure of link suitability, the neighbouring radio device corresponding to the link is not selected for transmission of a message if the $x^{th}$ percentile RSSI level is below the predetermined threshold.

Each radio device in the network collects the RSSI data and calculates the $x^{th}$ percentile RSSI level for each link established with a neighbouring radio. Thus, as one example, where one radio device has four neighbouring radios, it would collect the RSSI data for communications on the available channels and calculate the $x^{th}$ percentile RSSI level for each of the four links. This may be propagated throughout the network such that any radio device possess link suitability determination capability for communicating with any of the respective neighbouring radios on the network. Alternatively, the $x^{th}$ percentile RSSI level may be evaluated only locally to evaluate suitability of links to a neighbouring radio, whether or not the transmitting radio device and neighbouring radio device are associated with a mesh network.

The benefits of the $x^{th}$ percentile RSSI level as explained above are numerous. Unreliable links throughout the network can be identified, and by using only the reliable links, considerable improvements in network performance are realized. Stable RSSI indication values may be provided and displayed to system operators, which facilitates the operators ability to perform a radio survey or determine suitable locations to install antennas or other equipment that may improve network operation. Network stability, performance and reliability may be improved as instances of network reconfiguration due to message failures is reduced. Effective communication networks may be provided even in multi-path fading environments.

The benefits and advantages of the invention are now believed to have been amply illustrated in relation to the exemplary embodiments disclosed.

An embodiment of an input/output device is disclosed including: a transmitter configured to generate a radio frequency signal transmission; a receiver configured to receive a radio frequency signal transmission; and a processor-based control coordinating transmissions of radio frequency signal transmissions in response to received signal transmissions in a multi-signal path transmission network. The processor-based device is configured to: accept received signal strength indication (RSSI) values from incoming messages from at least one neighbouring radio on various frequency channels; and calculate a representative $x^{th}$ percentile RSSI level for the RSSI values accepted for a communications link established through the least one neighbouring radio; and utilize the calculated $x^{th}$ percentile RSSI level to route messages through the communications link; wherein x is strategically selected to avoid multi-path fading issues in message routing.

Optionally, the processor-based control of the input/output device may further be configured to compare the calculated representative $x^{th}$ percentile RSSI level to a predetermined threshold, and utilize the communications link to route messages only when the calculated representative $x^{th}$ percentile RSSI level is greater than the threshold. The predetermined threshold may be based upon the minimal signal strength that the receiver is capable of receiving, and the predetermined threshold may include a signal margin above the minimal signal strength that the receiver is capable of receiving.

The processor-based control of the input/output device may further be configured to calculate the representative $x^{th}$ percentile RSSI level based solely on the RSSI values accepted. The processor-based control of the input/output device may further be configured to calculate the representative $x^{th}$ percentile RSSI level based solely on RSSI values accepted and assigned values for RSSI levels on frequency channels for which no RSSI values were accepted. The processor-based control of the input/output device may further be configured to assign the RSSI levels on frequency channels for which no RSSI values were accepted to a value y, wherein y is less than the minimal signal strength that the receiver is capable of receiving, and recalculate the xth percentile RSSI level.

The processor-based control of the input/output device may also be further configured to: receive a route request including a destination for a proposed communication over the network; determine whether the input/output device is the destination, and, if so, generate and transmit a route reply message without delay; and if the input/output device is not the destination, determine whether a signal path to the destination from the input/output device to the destination is available, and if a signal path to the destination is available, generate and transmit a route reply message after at least a first predetermined amount of delay. The processor based control may further be configured to identify a metric corresponding to a desirability of the available signal path to the destination, and increase the first predetermined amount of delay in accordance with the metric.

The processor based control of the input/output device may also be further configured to accept an input of at least one sensor, and the processor based control further configured to transmit a data packet including the signal input to a remote location. The processor based control may further be configured to provide a signal output to at least one control device, and the processor based control further configured to receive a data packet from a remote location, the data packet including an instruction to the control device and the processor based control configured to output the instruction to the control device.

The transmitter and the receiver of the input/output device may be combined as a transceiver.

An embodiment of a multi-path radio communications network for monitoring and controlling an industrial process has also been disclosed. The network includes a plurality of processor-based radio devices configured to wirelessly communicate in a mesh network wherein each radio communicates with multiple other radio devices in the mesh network, and at least one of the plurality of processor-based radio device is configured to: accept received signal strength indication (RSSI) values from incoming messages on various frequency channels transmitted by a plurality of neighbouring radios; calculate a representative xth percentile RSSI level for the RSSI values accepted for each of the communication links established with the respective neighbouring radios; compare the calculated representative xth percentile RSSI level to a predetermined threshold, and utilize the respective communication links to route messages only when the calculated representative xth percentile RSSI level for the respective link is greater than the threshold.

Optionally, x may be strategically selected to avoid multi-path fading issues in message routing. The predetermined threshold may be based upon the minimal signal strength that the receiver is capable of receiving, and may further include a signal margin above the minimal signal strength that the receiver is capable of receiving.

The at least one of the plurality of processor-based radio device may further be configured to calculate the representative xth percentile RSSI level based solely on the RSSI values accepted. The at least one of the plurality of processor-based radio device may also be further configured to calculate the representative xth percentile RSSI level based solely on RSSI values accepted and assigned values for RSSI levels on frequency channels for which no RSSI values were accepted. The at least one of the plurality of processor-based radio device may further be configured to assign the RSSI levels on frequency channels for which no RSSI values were accepted to a value y, wherein y is less than the minimum signal strength that the at least one of the plurality of processor-based radio device is capable of receiving, and recalculate the xth percentile RSSI level.

The at least one of the plurality of processor-based radio device may further be configured to: receive a route request including a destination for a proposed communication over the network; determine whether a path to the destination exists from the input/output device to the destination; and if a path to the destination exists, generate and transmit a route reply message according to a prioritized communication protocol after at least a predetermined time delay, the time delay being dependent on a path metric corresponding to the path. The path metric may correspond to a desirability of the signal path to the destination. The metric may include an integer representing a number of radio station signal paths required to complete a communication to the destination, and wherein the predetermined time delay is equal to the product of the integer and a predetermined time duration. The path metric may correspond to a distance between each processor based radio device and the destination.

An embodiment of a multi-path radio communications system has also been disclosed. The system includes: a plurality of processor based radio devices configured to wirelessly communicate with one another in a mesh network having a frequency hopping spread spectrum topology, each of the plurality of processor based radio devices configured to: accept received signal strength indication (RSSI) values from incoming messages on various frequency channels for each one of a plurality of communication links established with neighbouring radios; calculate a representative xth percentile RSSI level for the RSSI values accepted; compare the representative xth percentile RSSI level to a predetermined threshold; and utilize the calculated xth percentile RSSI level to route messages through respective ones of the plurality of communication links only when the representative xth percentile RSSI level meets or exceeds the predetermined threshold.

Optionally, x may be strategically selected to avoid multi-path fading issues in message routing. Each of the plurality of processor based radio devices may also be configured to: receive a route request including a destination for a proposed communication over the network; determine whether a path to the destination exists to the destination; and if only an indirect path to the destination exists, generate and transmit a route reply message according to a prioritized communication protocol utilizing a selected one of a plurality of predetermined time windows for response.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An input/output device comprising:
 a transmitter configured to generate radio frequency signal transmissions and communicate messages to at least one neighbouring input/output device in a multi-signal path transmission network;
 a receiver configured to receive radio frequency signal transmissions including messages generated by the at least one neighbouring input/output device in the multi-signal path transmission network; and
 a processor-based control coordinating operation of the transmitter to generate the radio frequency signal transmissions in response to the received signal transmissions, the processor-based control configured to:
  accept received signal strength indication (RSSI) values from incoming messages from the at least one neighbouring input/output device on various frequency channels; and
  calculate a representative $x^{th}$ percentile RSSI level for the RSSI values accepted for a communications link established through the at least one neighbouring input/output device; and
  utilize the calculated $x^{th}$ percentile RSSI level to route messages through the multi-signal path transmission network;
 wherein x is strategically selected to avoid multi-path fading issues in message routing.

2. The input/output device of claim 1, wherein the processor-based control is further configured to compare the calculated representative $x^{th}$ percentile RSSI level to a predetermined threshold, and utilize the communications link to route messages only when the calculated representative $x^{th}$ percentile RSSI level is greater than the threshold.

3. The input/output device of claim 2, wherein the predetermined threshold is based upon a minimal signal strength that the receiver is operable to receive.

4. The input/output device of claim 3, wherein the predetermined threshold includes a signal margin above the minimal signal strength.

5. The input/output device of claim 1, wherein the processor-based control is further configured to calculate the representative $x^{th}$ percentile RSSI level based solely on the RSSI values accepted.

6. The input/output device of claim 1, wherein the processor-based control is further configured to calculate the representative $x^{th}$ percentile RSSI level based solely on RSSI values accepted and assigned values for RSSI levels on frequency channels for which no RSSI values were accepted.

7. The input/output device of claim 6, wherein the processor-based control is further configured to assign the RSSI levels on frequency channels for which no RSSI values were accepted to a value y, wherein y is less than a minimal signal strength that the receiver is operable to receive, and recalculate the $x^{th}$ percentile RSSI level.

8. The input/output device of claim 1, wherein the processor-based control is further configured to:
 receive a route request including a destination for a proposed communication over the network;
 determine whether the input/output device is the destination, and, if so, generate and transmit a route reply message without delay; and
 if the input/output device is not the destination, determine whether a signal path to the destination from the input/output device to the destination is available, and if a signal path to the destination is available, generate and transmit a route reply message after at least a first predetermined amount of delay.

9. The input/output device of claim 8, wherein the processor based control is further configured to identify a metric corresponding to a desirability of the available signal path to the destination, and increase the first predetermined amount of delay in accordance with the metric.

10. The input/output device of claim 1, wherein the processor-based control is configured to accept an input of at least one sensor, and wherein the processor-based control further is configured to transmit a data packet including the input to a remote location.

11. The input/output device of claim 10, wherein the processor-based control is further configured to provide a signal output to at least one control device and to receive a data packet from the remote location, the data packet including an instruction to the control device and the processor based control configured to output the instruction to the control device.

12. The input/output device of claim 1, wherein the transmitter and the receiver are combined as a transceiver.

13. A multi-path radio communications network for monitoring and controlling an industrial process, the network comprising:
 a plurality of processor-based radio devices configured to wirelessly communicate in a mesh network wherein each processor-based radio device communicates with multiple other processor-based radio devices in the mesh network; and at least one of the plurality of processor-based radio devices is configured to:

accept received signal strength indication (RSSI) values from incoming messages on various frequency channels transmitted by a plurality of neighbouring radios;

calculate a representative $x^{th}$ percentile RSSI level for the RSSI values accepted for each of the communication links established with the respective neighbouring radios;

compare the calculated representative $x^{th}$ percentile RSSI level to a predetermined threshold, and utilize the respective communication links to route messages only when the calculated representative $x^{th}$ percentile RSSI level for the respective link is greater than the threshold.

14. The multi-path radio communications network of claim 13, wherein x is strategically selected to avoid multi-path fading issues in message routing.

15. The multi-path radio communications network of claim 13, wherein the predetermined threshold is based upon a minimal signal strength that at least one of the plurality of processor-based radio devices is operable to receive.

16. The multi-path radio communications network of claim 15, wherein the predetermined threshold includes a signal margin above the minimal signal strength.

17. The multi-path radio communications network of claim 13, wherein the at least one of the plurality of processor-based radio devices is further configured to calculate the representative $x^{th}$ percentile RSSI level based solely on the RSSI values accepted.

18. The multi-path radio communications network of claim 13, wherein the at least one of the plurality of processor-based radio devices is further configured to calculate the representative $x^{th}$ percentile RSSI level based solely on RSSI values accepted and assigned values for RSSI levels on frequency channels for which no RSSI values were accepted.

19. The multi-path radio communications network of claim 18, wherein the at least one of the plurality of processor-based radio devices is further configured to assign the RSSI levels on frequency channels for which no RSSI values were accepted to a value y, wherein y is less than a minimum signal strength that the at least one of the plurality of processor-based radio devices is operable to receive, and recalculate the $x^{th}$ percentile RSSI level.

20. The multi-path radio communications network of claim 13, wherein the at least one of the plurality of processor-based radio devices is further configured to:

receive a route request including a destination for a proposed communication over the network;

determine whether a path to the destination exists from at least one of the plurality of processor-based radio devices to the destination; and if a path to the destination exists, generate and transmit a route reply message according to a prioritized communication protocol after at least a predetermined time delay, the predetermined time delay being dependent on a path metric corresponding to the path.

21. The multi-path radio communications network of claim 20, wherein the path metric corresponds to a desirability of the path to the destination.

22. The multi-path radio communications network of claim 20, wherein the path metric comprises an integer representing a number of radio station signal paths required to complete a communication to the destination, and wherein the predetermined time delay is equal to the product of the integer and a predetermined time duration.

23. The multi-path radio communications network of claim 20, wherein the path metric corresponds to a distance between each processor based radio device and the destination.

24. A multi-path radio communications system comprising:

a plurality of processor based radio devices configured to wirelessly communicate with one another in a mesh network having a frequency hopping spread spectrum topology, each of the plurality of processor based radio devices configured to:

accept received signal strength indication (RSSI) values from incoming messages on various frequency channels for each one of a plurality of communication links established with neighbouring radios;

calculate a representative $x^{th}$ percentile RSSI level for the RSSI values accepted;

compare the representative $x^{th}$ percentile RSSI level to a predetermined threshold; and utilize the calculated $x^{th}$ percentile RSSI level to route messages through respective ones of the plurality of communication links only when the representative $x^{th}$ percentile RSSI level meets or exceeds the predetermined threshold.

25. The system of claim 24, wherein x is strategically selected to avoid multi-path fading issues in message routing.

26. The system of claim 24, each of the plurality of processor based radio devices further configured to:

receive a route request including a destination for a proposed communication over the network;

determine whether a path to the destination exists; and if only an indirect path to the destination exists, generate and transmit a route reply message according to a prioritized communication protocol utilizing a selected one of a plurality of predetermined time windows for response.

* * * * *